C. K. FINKBEINER.
PROCESS FOR MAKING GLASS BOTTLES AND SIMILAR ARTICLES.
APPLICATION FILED APR. 19, 1916.
1,266,785.
Patented May 21, 1918.
2 SHEETS—SHEET 1.
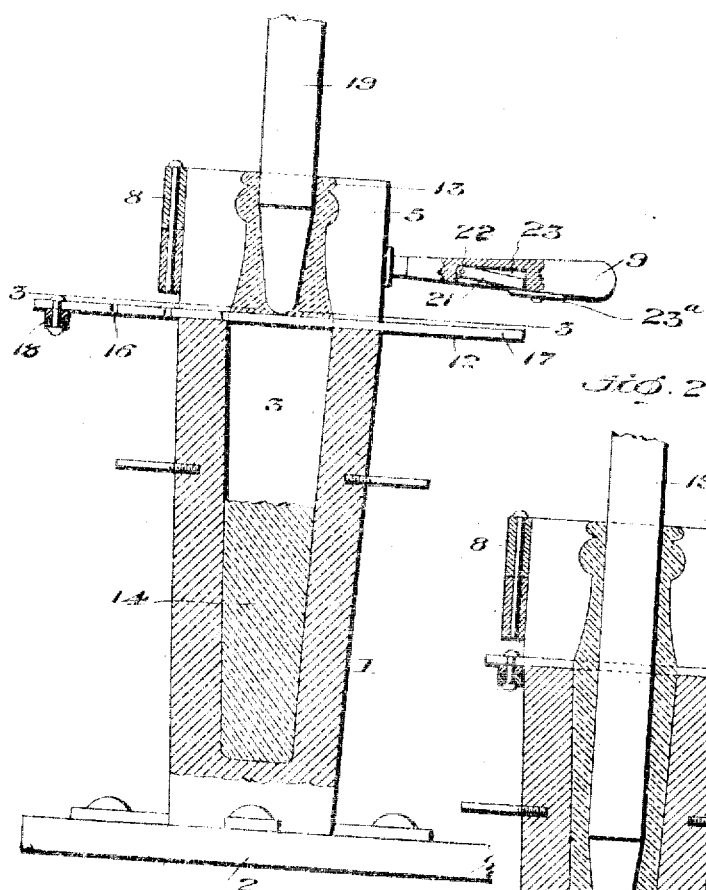
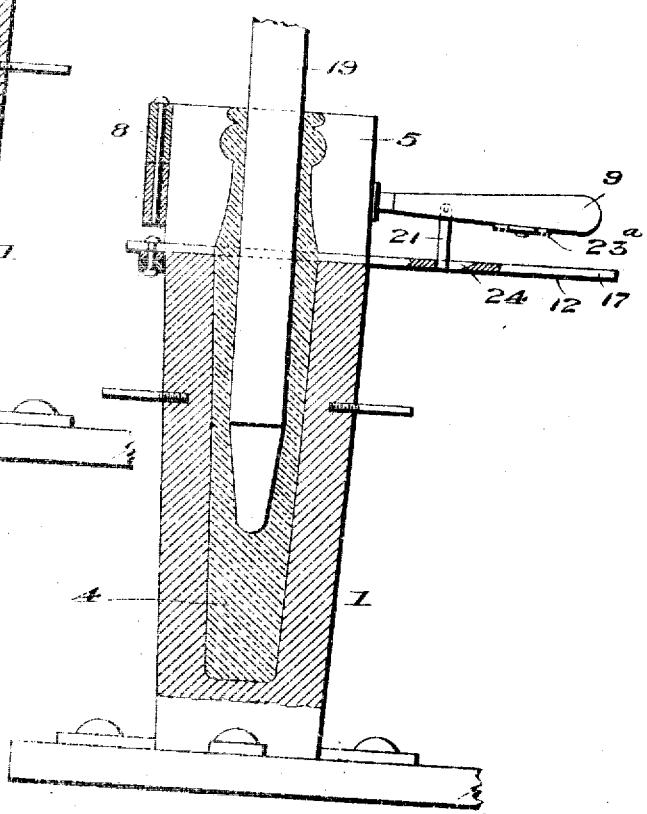
Charles K. Finkbeiner, Inventor C. K. FINKBEINER.
PROCESS FOR MAKING GLASS BOTTLES AND SIMILAR ARTICLES.
APPLICATION FILED APR. 19, 1916.
1,266,785.
Patented May 21, 1918
2 SHEETS—SHEET 2.
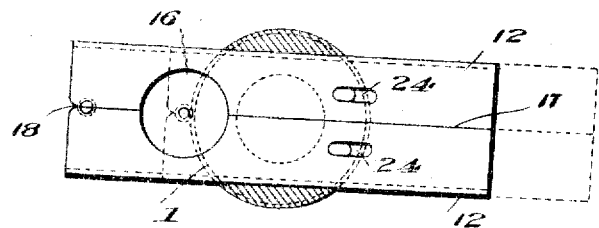
Fig. 3.
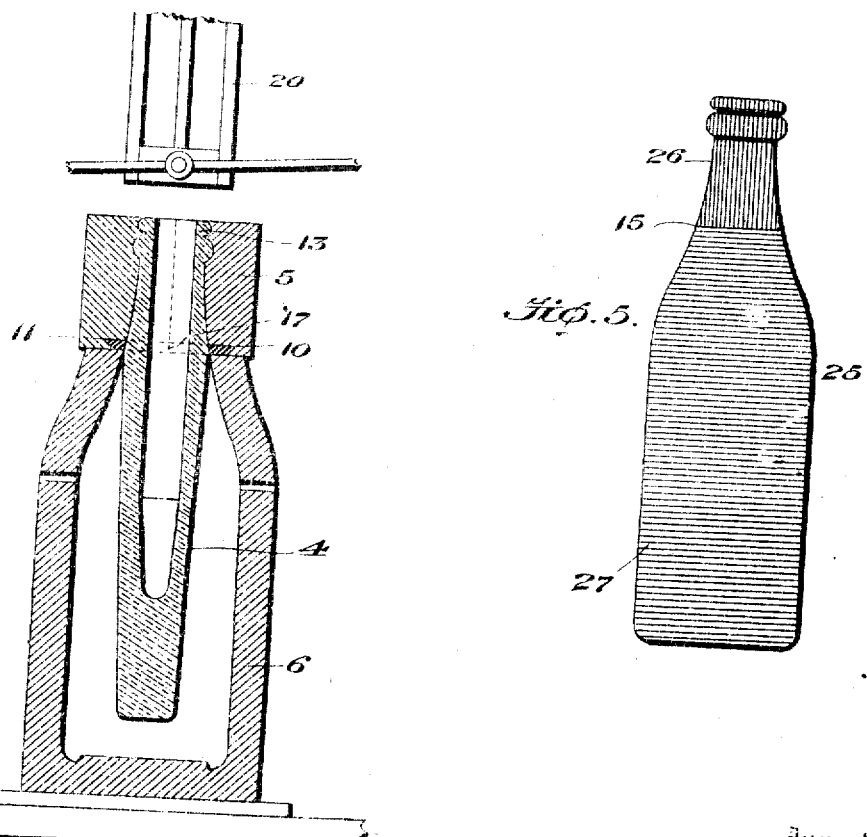
Fig. 4.
Fig. 5.
Charles K. Finkbeiner, Inventor
By Chas. C. Stauffer
Attorney
Witness

UNITED STATES PATENT OFFICE.

CHARLES K. FINKBEINER, OF LAURENS, SOUTH CAROLINA, ASSIGNOR, BY DIRECT AND MESNE ASSIGNMENTS, TO PARTI-COLORED GLASS BOTTLE COMPANY, OF WASHINGTON, DISTRICT OF COLUMBIA, A CORPORATION OF DELAWARE.

PROCESS FOR MAKING GLASS BOTTLES AND SIMILAR ARTICLES.

1,266,785.  Specification of Letters Patent.  Patented May 21, 1918.

Application filed April 19, 1916. Serial No. 92,178.

*To all whom it may concern:*

Be it known that I, CHARLES K. FINKBEINER, a citizen of the United States, residing at Laurens, in the county of Laurens and State of South Carolina, have invented certain new and useful Improvements in Processes for Making Glass Bottles and Similar Articles, (Case A;) and I do hereby declare the following to be a full, clear, and exact description of the invention, such as will enable others skilled in the art to which it appertain to make and use the same.

My invention relates to the manufacture of glass bottles and similar objects, and has for its object to produce a single piece integral bottle or analogous receptacle having distinctive portions, such, for instance, as the neck and body portions, of different kinds of glass such as tinted glass and plain glass, or glass of different tints, in order to ornament the bottle or other receptacle, or to render the same distinctive for various purposes; thus producing in the glass itself that party-colored effect now sometimes secured by applying tinfoil caps and similar sealing devices for such purpose.

The neck or body portion of the glass may be made in several portions, or with several colors, if desired, and the process may also be extended to other objects than bottles and similar receptacles.

The invention consists in the method of accomplishing the results just mentioned in the following manner:

I charge into a parison or preliminary mold masses of different kinds or colors of glass in a semi-fused or plastic condition, and of such a nature as to provide in the completed article glass of different or contrasting color or quality; and while these masses of glass are still plastic and hot, I unite them by forcing into them a plunger in such a manner and under such conditions that said masses of glass are pressed into intimate contact with each other, and become fused or welded together permanently and completely at the plane of contact or juncture.

I find it desirable to keep the two kinds of glass separated until, at the instant of bringing them together, pressure may be applied to perfect the weld. This pressure may be applied by the use of a molding plunger, the displacement of which plunger should be slightly greater or at least equal to the void or space unfilled with glass in the parison mold; it being desirable that the action of the plunger should transmit pressure to the entire mass of fused glass contained in the mold, and thus insure a complete welding action.

The unfinished article thus formed is sometimes called a parison. It is removed from the primary mold, its condition being that of practical homogeneity in so far as the union of the two masses of glass is concerned, and is subjected to further treatment in a blowing mold to form the completed article.

One form of apparatus to accomplish the result stated is shown in the accompanying drawings, in which:—

Figure 1 is a vertical sectional view of a portion of the apparatus, the parts being arranged for molding the neck of the bottle;

Fig. 2 is a similar view, the parts being arranged for completing the blank;

Fig. 3 is a horizontal sectional view on the line 3—3 of Fig. 1;

Fig. 4 is a vertical sectional view showing the blank arranged within the blow mold; and Fig. 5 is an elevation of a completed bottle.

Like reference symbols designate corresponding parts in all the views.

1 designates a blank mold of any desired construction, bolted or otherwise secured upon a table 2, and preferably provided with a downwardly tapered cylindrical interior mold cavity 3, to enable the completed blank 4 to be readily lifted out of the blank mold by a neck mold 5, in order to transfer the said blank 4 from the blank mold to a blow mold 6. The neck mold 5, which is composed of two hinged sections connected at the back by a suitable hinge 8 and provided with handles 9 at the front, may be of any desired construction and interior configuration to mold a neck of the desired form. The neck mold, which is adapted to be arranged against the mouth of the blank mold, or the blow mold, is preferably provided in its lower face with a dove-tailed groove or way 10 formed in the sections of the collar or mold, and having inclined side walls adapted to receive the beveled side edges 11 of a gate 12. adapted to close the neck mold for confining therein a quantity of glass 13 of a different kind as to shade or color from a quantity of glass 14 contained in the blank mold, whereby a party-colored effect is secured. The gate 12, which is constructed of sheet metal, or other suitable material, is slidable through the dove-tail way 10, and it is adapted to project in advance and in rear of the neck mold. It is provided with an aperture 16 of a diameter corresponding to that of the mouth or entrance of the blank mold and adapted to be brought into position to cause the opening 16 to register therewith after the completion of the neck molding operation. The gate 12 is preferably constructed of two longitudinal sections having meeting inner edges 17, connected at the back by a hinge 18 which is adapted to form a stop for engaging the blank mold, to limit the forward or outward movement of the gate 12 with the opening 16 in register with the mouth or entrance of the blank mold.

The glass 14, which forms the lower or body portion of the bottle, is placed in the mold prior to the placing of the neck mold upon the blank mold 1. After the glass 14 is placed in the blank mold, the neck mold is placed thereon with the imperforate portion of the gate 12 covering the mouth or entrance of the blank mold for confining the glass 13 in the neck or collar mold. The glass 13 is then placed in the neck mold, and the plunger 19 is moved downwardly to the position illustrated in Fig. 1 of the drawings to mold the neck or ring portion of the bottle. The gate 12 is then pulled outward to bring the opening 16 over the mouth or entrance of the blank mold and the plunger is then moved downwardly to the limit of its downward movement to complete the molding of the bottle blank, and the fusion together or welding of the different masses of glass. The plunger forces the glass 14 upward and causes the same to unite with the glass 13, which forms the neck or ring portion of the bottle.

It will be noted that the pressure of the plunger upon and into the hot and almost liquid glass in the blank mold insures a strong weld and complete union between the two masses of glass. The strength and finish of the joint here produced is further improved by the subsequent operation of blowing, and also by the final operation of annealing.

The blank, after being completed in the manner illustrated in Fig. 2 of the drawing, is transferred to the blow mold 6, and the molding of the bottle is completed by bringing the blow head 20 down upon the neck mold in the usual manner. The blow mold 6 is of the usual construction, being composed of two hinged sections which are adapted to be opened to permit the removal of the bottle, which, after removal, is treated in the usual manner in a leer or annealing oven. The sections of the gate 12 are adapted to be opened simultaneously with the sections of the neck mold; and the handles 9 are provided with pivoted arms 21 secured by a pivot 22 in a recess 23 in the lower side of each of the handles 9. These pivoted arms are adapted to drop by gravity into notches or openings 24 formed in the sections of the gate 12, as clearly illustrated in Fig. 2 of the drawings. The pivoted arms 21 are normally held within the recesses 23 by pivoted catches or buttons 23ª located at the lower faces of the handles. The pivoted arms 21 are adapted to lock the sections of the gate 12 with the handles of the sections of the neck mold so that when the latter is opened, the sections of the gate 12 will also be opened for removal from the neck of the bottle or other receptacle.

The completed bottle 25, illustrated in Fig. 5 of the drawing, is shown with its neck portion 26 of red glass and its bottom portion 27 of blue glass for convenience of illustration. Any other distinguishing kind if glass may be employed, as, for instance, the body portion of the bottle may be of ordinary flint glass, and the neck portion of tinted glass. Also while the slidable gate is shown applied to the neck mold at the bottom thereof for making the neck portion of the bottle distinctive from the rest of the same, the gate may be located at any other desired point so as to make the neck portion of greater or less length.

The gate may, for instance, be fitted into the top of the body mold, in which instance it need not be pivoted, since the opening therein being of the same dimensions as the opening in the body mold, the blank may be easily withdrawn through it.

It will be seen that the blank may be formed by molding the same in either an upright or inverted position, and that various other forms of apparatus may be used to carry out the herein described process. Thus the different kinds of glass may be placed in suitable receptacles and then superposed and welded together by forcing in a plunger without the interposing of a sliding gate. Moreover, there may be several layers of glass of different qualities, instead of two only as shown. Furthermore, the colored layers may run longitudinally of the bottle, or in other directions than transversely as shown.

I claim as my invention.

1. The method of making bottles of glass of several kinds which consists in placing in a preliminary mold separated masses of glass of several kinds, and passing a plunger into said separated masses in succession until they fuse together or blend, and afterward blowing.

2. The method of making bottles of glass of several kinds which consists in placing in a preliminary mold, separated masses of glass of several kinds, and passing a plunger into and through said separated masses in succession, until the glasses and plunger fill the mold, whereby the several masses of glass fuse or blend together, and afterward blowing.

3. The method of making bottles of glass of several kinds which consists in placing in a preliminary mold, masses of glass in separated relation, and in quantity sufficient with the plunger to fill the mold, passing a plunger into and through said masses of glass in succession, until the masses become fused together, withdrawing and blowing.

4. The method of forming an object of glass which consists in placing hot glass in segregated portions in a preliminary mold, then pressing an object thereinto and thereby bringing said portions into close contact until adhesion ensues while in the mold, and then while still hot withdrawing said adhering portions and completing the act of forming said object.

5. The method of forming a hollow glass object which consists in placing hot glass of different qualities in segregated portions in a preliminary mold to partially fill said mold, completely filling said mold by passing into the mold and into the masses of glass, a hollow forming device whereby the masses of glass are fused or welded together, and the complete mass given the shape of the inside of the mold, then withdrawing the object and completing its formation by blowing.

6. The method of making a party-colored glass bottle which consists in placing in a parison mold a mass of hot glass of one color, placing in said mold, with said mass of glass, a hot mass of glass of another color, thrusting a plunger through the two masses of glass forming a cavity therein, and exerting pressure on the plastic glass until the two masses are fused or welded together and the parison completed, then blowing to complete the bottle.

7. The method of making a colored-necked bottle which consists in placing in the bottom of a parison mold enough hot glass to make the body of a bottle, inserting a support between the body mold and the neck-mold, placing upon said support enough hot glass, of a different color, to make the neck, thrusting a plunger through the latter portion, withdrawing the support, continuing the thrust through the body portion of glass until the two weld or fuse together, withdrawing the parison, and finishing the bottle in a blow mold.

In testimony whereof, I affix my signature.

CHAS. K. FINKBEINER.